United States Patent [19]
Corley

[11] 4,129,066
[45] Dec. 12, 1978

[54] BASTING DEVICE

[76] Inventor: John C. Corley, 10469 Whitebridge, St. Louis, Mo. 63141

[21] Appl. No.: 874,853

[22] Filed: Feb. 3, 1978

[51] Int. Cl.² ............................................. A47J 37/10
[52] U.S. Cl. ........................................ 99/345; 99/532
[58] Field of Search ................. 99/345, 532; 222/191; 47/48.5; 111/7.1, 7.2, 7.3

[56] References Cited

U.S. PATENT DOCUMENTS

| | | | |
|---|---|---|---|
| 1,485,253 | 2/1924 | Devlin | 99/532 X |
| 1,732,279 | 10/1929 | Reimers | 111/7.2 |
| 2,214,083 | 9/1940 | Lester | 111/7.1 X |
| 2,242,789 | 5/1941 | McFee | 111/7.1 |
| 2,544,316 | 3/1951 | Higgins | 99/532 |
| 2,602,391 | 7/1952 | Pedranti et al. | 99/345 |
| 2,652,765 | 9/1953 | Risco | 99/345 |
| 3,082,681 | 3/1963 | Petersen | 99/532 |
| 3,303,800 | 2/1967 | Young | 111/7.1 |
| 3,410,457 | 11/1968 | Brown | 99/532 X |
| 3,530,785 | 9/1970 | Peters et al. | 99/532 |

*Primary Examiner*—Daniel Blum
*Attorney, Agent, or Firm*—Grace J. Fishel

[57] ABSTRACT

A basting device for injecting fluid flavoring material under pressure, said device including a hollow elongated member with perforations adjacent one end and with an annular flange adjacent the other end. A tip having a pointed head for penetrating a food article is threadedly attached to the end of the elongated member adjacent the perforations. A bowl is threadedly attached to the flange, said flange forming a cover and including peripheral grooves communicating with the bowl for pressure relief if the device becomes plugged, said elongated member extending through the flange and including perforations for straining the flavoring fluid.

6 Claims, 5 Drawing Figures

BASTING DEVICE

The present invention relates to an automatic basting device for continuously injecting fluid flavoring material into food during cooking.

Open roasting of meat or fowl provides a different flavor from that provided when the food is steamed in a covered pan. While the flavor from open roasting is superior, it is desirable that the meat or fowl be occasionally basted during cooking so that it does not become dried out.

Various devices have been proposed for continuously basting a roast during cooking. Some of these devices have included upstanding hollow members for recirculating seasoning materials collected in the bottom of the roasting pan. One problem with such devices is that the basting fluids tend to evaporate from the pan as the food is cooked.

Other devices have involved closed systems for injecting basting fluid under pressure. The present device is of such a kind but includes a combination of features not found in prior art constructions.

Among the several objects of the present invention may be noted the provision of a basting device for injecting fluid flavoring material, seasoning, tenderizer or the like under pressure into foods during baking or roasting, said device including a bowl for holding the fluid, a perforated hollow elongated member with a flange for detachably latching the bowl to the flange at one end and a tip detachably latched at the other. Another object is to provide a basting device having a tip which resists inadvertent separation from the device when it is withdrawn from the cooked food but which is adapted to be easily removed during cleaning. Still yet another object is to provide a basting device wherein the member penetrating the roast extends into the bowl containing the flavoring material and includes perforations for straining the flavoring fluid to prevent plugging of the device. A still further object is to provide a basting device wherein the means for detachably latching the bowl to the flange includes means for relieving the pressure if the device becomes plugged. Other objects and features will be in part apparent and in part pointed out hereinafter. The invention accordingly comprises the constructions hereinafter described, the scope of the invention being indicated by the subjoined claims.

In the accompanying drawings in which one of various possible embodiments of the invention is illustrated, corresponding reference characters refer to corresponding parts throughout the several views of the drawings wherein.

Figure 1:
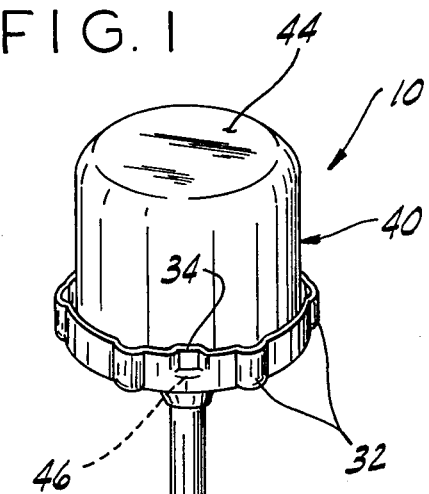
FIG. 1 is a perspective view of a basting device in accordance with the present invention.
Figure 2:
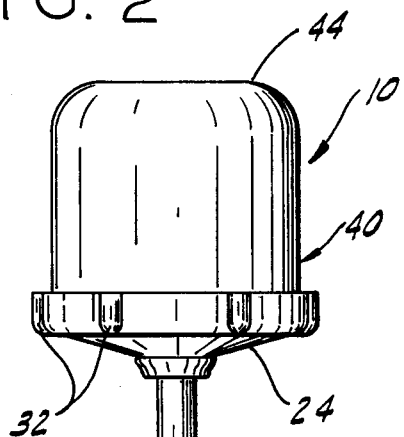
FIG. 2 is a side elevational view of the baster shown in FIG. 1.
Figure 4:
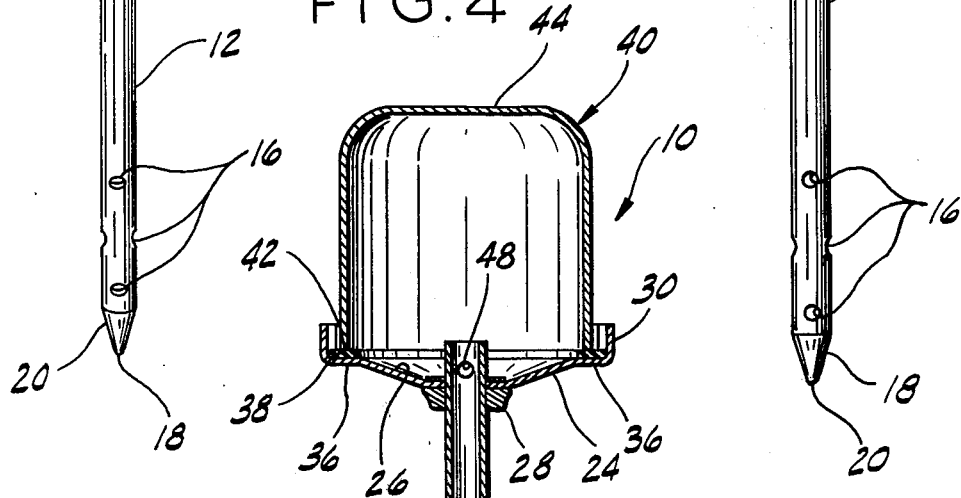
FIG. 4 is a cross-sectional view taken along line 4—4 in FIG. 3.
Figure 3:
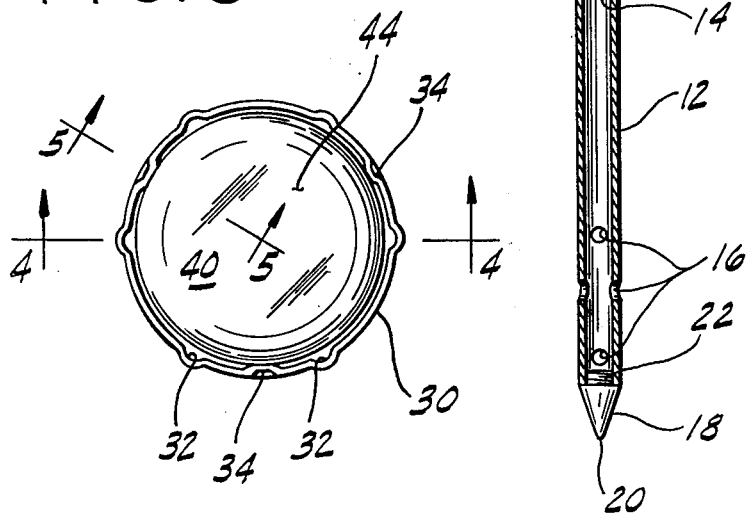
FIG. 3 is a top plan view of the baster shown in FIGS. 1 and 2.

Referring to the drawings, more particularly by reference character, reference numeral 10 refers to a basting device in accordance with the present invention. Basting device 10 includes a hollow elongated member 12 shown as a tube with a central longitudinal bore 14 extending therethrough. Adjacent the forward end of tube 12 is a plurality of perforations 16 communicating longitudinal bore 14 with the outside of the tube. Preferably, perforations 16 are formed in diametrically opposed pairs transverse longitudinal bore 14. As shown in FIG. 4, adjacent pairs of perforations 16 are preferably positioned out of registry with each other for better distribution of the basting fluid throughout the food article.

Forward of perforations 16, tube 12 is threaded for engagement with a tip 18. Tip 18 has a pointed head 20 and is cooperatively threaded at other end 22 for attachment to tube 12. So attached, tip 18 resists inadvertent separation when basting device 10 is removed from the roast but, on the other hand, is easily removed for cleaning.

A flange 24 is provided adjacent the rearward end of tube 12. As shown, flange 24 is annular and dish-shaped so as to have a concave side 26 facing the rearward end of tube 12.

Care must be taken to insure an airtight joint between tube 12 and flange 24 since any leak in this joint would render the device inoperative for its intended use. Although a weld 28 is shown for this purpose, it is clear that other conventional joints could be used. Alternatively, tube 12 and flange 24 could be integrally formed.

Flange 24 has a peripheral lip 30 with a plurality of longitudinally spaced grooves 32 formed on the inside thereof. In addition to groves 32, lip 30 has a plurality of spaced crimps 34 formed by forcing a portion of the lip inwardly. Dish-shaped flange 24 is slightly flattened adjacent lip 30 to provide a peripheral shoulder or rim 36 for receipt of an annular gasket 38. Longitudinal grooves 32 communicate the outside of lip 30 with rim 36 for use as described below.

Flange 24 provides a cover for upended bowl 40 which is seated at its rim 42 on gasket 38. As shown, bowl 40 has a flattened bottom 44 for supporting basting device 10 when it is filled with basting fluid but not in use. Bowl 40 is attached to flange 24 by means of a plurality of transverse lugs 46 which cooperate with crimps 34 to provide a bayonette type latch. As shown in the drawings, transverse lugs 46 are formed by forcing a portion of the bowl outwardly near its open end. The seal between bowl 40 and flange 24 is airtight to a preselected internal pressure above which excess pressure is vented through grooves 32.

For venting, this pressure is determined by the resilience of the gasket and the relative spacing of crimps 34 and transverse lugs 46. The more firmly rim 42 is pressed into gasket 38, the higher will be the pressure before the device is vented. This pressure should be selected so that there is a large safety factor to prevent the pressure within the device from exceeding the bursting strength of the material from which it is made. This is easily determined once the metal, high temperature plastic or other material has been selected for the device.

As seen in FIG. 4, the rearward end of tube 12 extends beyond flange 24 into bowl 40. It also includes perforations 48 shown diametrically opposed and providing a bore transverse longitudinal bore 14. So formed, perforations 48 provide a strainer for the basting fluid. If longitudinal bore 14 should become plugged by a bay leaf, peppercorn, garlic clove or the like, the basting fluid will still flow through perforation 48. Similarly, if one of perforations 48 becomes clogged, it is unlikely that the other perforations and bore 14 will also become plugged at the same time.

In use, bowl 40 is unlatched from flange 24. This is accomplished by twisting bowl 40 so that transverse lugs 46 are unlatched from crimps 34. Bowl 40 is then rested on its flat bottom 44 and filled with basting fluid. The contents of the basting fluid are determined by the tastes of the user but can include spices such as garlic, onion, pepper, bay, rosemary, thyme, cloves or the like. Wine, water, fruit juices, melted fats or the like can be used as the liquid.

Figure 5:
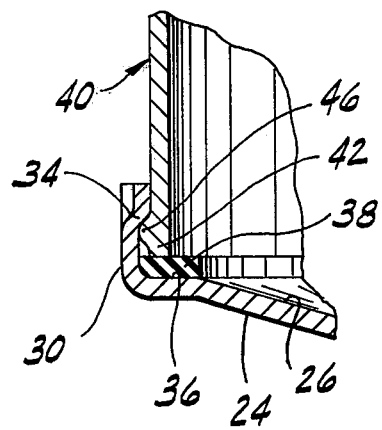
FIG. 5 is an enlarged cross-sectional view taken along line 5—5 in FIG. 3 showing a portion of the device.

Once the bowl is filled with the selected basting fluid, flange 24 is tightened on bowl 40 as shown in FIG. 5. Baster 10 can then be turned upside down into the position shown in the drawings and inserted into the food article. Since baster 10 in assembled condition is airtight at weld 28 and gasket 38, the basting fluid will not leak from the device.

As the roast cooks, the basting fluid is vaporized thus forcing the basting fluid into the food article under pressure. The pressure created during cooking tends to keep perforations 16 and 48 open and provides for excellent penetration of the basting fluid. If desired, baster 10 can be refilled during the cooking process and injected in the food article in a different location.

When cooking is over, basting 10 is easily cleaned. With tip 18 and bowl 40 unlatched from tube 12, a pipe cleaner or coffee stem brush may be used for cleaning longitudinal bore 14. The other parts are similarly easily cared for.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense. For example, if desired, tip 18 may include a number of flutes radiating from pointed head 20 to facilitate insertion of device 10 into the food article. Other such changes will be readily apparent to one skilled in the art and are included herein.

What is claimed is:

1. A basting device for injecting fluid material under pressure comprising a hollow elongated member with perforations adjacent a forward end and with an annular flange adjacent a rearward end, a tip having a pointed head for penetrating a food article threadedly attached to the forward end of the hollow elongated member adjacent the perforations, a detachable, rigid bowl threadedly attached to the flange, said flange forming a cover for the bowl and including a plurality of peripherally spaced grooves communicating with the bowl for pressure relief and said elongated member extending through the flange into the bowl and including perforations for straining the basting fluid.

2. The device according to claim 1 wherein the hollow elongated member has a central longitudinal bore extending therethrough and wherein the perforations adjacent the forward end are formed in diametrically opposed pairs transverse the longitudinal bore and with adjacent pairs of perforations positioned out of registry with each other for better distribution of the basting fluid throughout the food article.

3. The device according to claim 2 wherein the flange is annular and dish-shaped with its concave side facing the rearward end of the hollow elongated member.

4. The device according to claim 3 wherein the peripheral grooves in the flange are formed in a peripheral lip and wherein the flange is flattened adjacent the lip to provide a peripheral shoulder for receipt of a resilient annular gasket.

5. The device according to claim 4 wherein the bowl is threadedly attached to the flange by means of a plurality of peripherally spaced inwardly directed crimps in the lip and by means of a plurality of peripherally spaced outwardly directed transverse lugs in the bowl, said crimps cooperating with said transverse lugs to provide a bayonette latch.

6. The device according to claim 5 wherein the bowl has a flattened bottom for supporting the basting device when it is not in use.

* * * * *